(12) United States Patent
Leister (10) Patent No.: US 12,298,635 B2
(45) Date of Patent: May 13, 2025

(54) LIGHT MODULATION DEVICE

(71) Applicant: SEEREAL TECHNOLGIES S.A., Munsbach (LU)

(72) Inventor: Norbert Leister, Dresden Sachsen (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 643 days.

(21) Appl. No.: 17/268,698

(22) PCT Filed: Jul. 1, 2019

(86) PCT No.: PCT/EP2019/067561
§ 371 (c)(1),
(2) Date: Feb. 16, 2021

(87) PCT Pub. No.: WO2020/035206
PCT Pub. Date: Feb. 20, 2020

(65) Prior Publication Data
US 2021/0231996 A1    Jul. 29, 2021

(30) Foreign Application Priority Data

Aug. 16, 2018 (EP) ..................... 18189229

(51) Int. Cl.
*G02F 1/1347* (2006.01)
*G02F 1/1335* (2006.01)
*G02F 1/139* (2006.01)

(52) U.S. Cl.
CPC ........ *G02F 1/13471* (2013.01); *G02F 1/1393* (2013.01)

(58) Field of Classification Search
CPC .. G02F 1/1347; G02F 1/13471; G02F 1/1335; G02F 1/133528; G02F 1/1393
See application file for complete search history.

(56) References Cited

U.S. PATENT DOCUMENTS 5,719,650 A * 2/1998 Wefers ................ G02F 1/13471
349/74
2011/0221982 A1 9/2011 Tanaka
2012/0147280 A1 6/2012 Osterman et al.

OTHER PUBLICATIONS

International Search Report, dated Sep. 26, 2019, and Written Opinion issued in International Application No. PCT/EP2019/067561.

* cited by examiner

*Primary Examiner* — Thoi V Duong
(74) *Attorney, Agent, or Firm* — Saul Ewing LLP (57) ABSTRACT

The invention relates to a light modulation device for a complex-valued modulation of linearly polarized incident light, comprising a first light modulator, a subsequently arranged second light modulator and at least one polarizer, where the first light modulator and the second light modulator are configured as phase modulators, where a modulation axis of the first light modulator is aligned at an angle to the modulation axis of the second light modulator, and where the polarization direction of the light incident on the first light modulator and the polarization direction of the polarizer are respectively aligned at predetermined non-90° angles with respect to the modulation axis of the first light modulator and the modulation axis of the second light modulator.

13 Claims, 6 Drawing Sheets

LIGHT MODULATION DEVICE

CROSS REFERENCE TO RELATED APPLICATIONS

This application claims the priority of PCT/EP2019/067561, filed on Jul. 1, 2019, which claims priority to European Application No. EP 18189229.0, filed on Aug. 16, 2018, the entire contents of each of which are incorporated fully herein by reference.

BACKGROUND OF THE INVENTION

The invention relates to a light modulation device and to a method for a complex-valued modulation of linearly polarized incident light.

The invention furthermore relates to a display device for the representation of two-dimensional or three-dimensional scenes.

Such a light modulation device is suitable for hologram reconstruction in which complex-valued modulation of linearly polarized coherent input radiation is carried out. Application fields of such a light modulation device are display devices for video players and TV sets, as well as projectors for holographic reproduction. In this case, the light modulation device is divided into drivable cells (pixels), which preferably allows realtime or at least near-realtime holographic representation of a video. The video consists of a multiplicity of scenes (individual images), which are respectively encoded as a hologram into the cells of the light modulation device. The scenes may correspond to a real arrangement of objects, or they may be computer-generated. Methods which take into account the properties of the light modulation device, for example exclusive phase modulation, are known for the encoding.

Such complex-valued modulation may be achieved by amplitude and phase modulation carried out successively in two suitable light modulators in the propagation direction of the input radiation. This, however, requires an amplitude modulator and a phase modulator which have similar switching times and are matched sufficiently well to one another.

As an alternative, arrangements and methods which use a phase sum or two-phase encoding are known. In this case, the output radiation of two phase modulators is combined by means of a beam splitter and made to interfere, so that the amplitude and phase can be adjusted for each cell of a hologram.

There are furthermore arrangements for two-phase encoding, in which adjacent cells of a phase modulator modulate the input radiation in such a way that their output radiation has the desired amplitude and phase at the position of an observer by interference. In this case, two or more subpixels of a phase modulator form a pixel of a hologram. Spatial light modulators (SLMs) may be used as the light modulators.

Devices and methods for providing holographic displays are known from applications in the name of the Applicant, such as EP 1 563 346 A2, DE 10 2004 063 838 A1, DE 10 2005 023 743 A1 and WO 2008/151980 A1. Furthermore, such devices are also described in the document "Full-range, continuous, complex modulation by the use of two coupled-mode liquid-crystal televisions", Neto et al., Applied Optics Vol. 35, No 23, pp 4567. The light modulators described in this document, which follow one another in the beam path, use liquid-crystal displays with twisted nematic technology. In a document referred to as citation 2 in this document, an arrangement having a phase modulator with twisted nematic technology and a subsequent amplitude modulator with twisted nematic technology is mentioned. In both arrangements, the modulation of the output radiation is given by the product of the modulations of the two successive modulators. A polarizer is arranged before and after each modulator. In this case, it may be necessary to provide different polarization directions for different wavelengths for correct functioning.

Document U.S. Pat. No. 5,719,650 discloses a light modulator with which amplitude and phase can be controlled independently of one another. It consists of two polarization-rotating elements, each with a liquid-crystal layer, which are respectively arranged between two carrier substrate plates. The ground electrodes and the array electrodes are additionally provided for each layer. The matching of the elements with respect to one another is already carried out in the production phase.

The liquid crystals used to produce the light modulators are birefringent materials in which the orientation of the optical axis of the molecules can be adjusted in a desired direction, for example by an electric field. In the case of a nematic liquid crystal, the optical axis corresponds to the longitudinal axis of the molecules. The modulation of the incident light depends on the adjustment direction of the optical axes of the molecules with respect to the transmission direction and the polarization of the light passing through. The alignment of the molecules in the absence of the effect of a field is achieved by a pretreatment of the surfaces of the light modulator which faces toward the liquid crystal. The molecules may thus be aligned parallel to the surface. Under the effect of the electric field, the molecules of a nematic liquid crystal with a positive dielectric anisotropy rotate in the direction of the field. If the electric field is perpendicular to the surface of the substrates (out-of-plane field), under an applied field the molecules rotate perpendicularly to the surface of the substrates. In relation to light passing perpendicularly through the light modulator, the orientation of the molecules is therefore changed from perpendicular to parallel by the electric field. In this case, the birefringent effect of the liquid-crystal cell is reduced.

Nematic liquid crystals with a negative dielectric anisotropy may, for example, be aligned substantially perpendicularly to the surface of a substrate, with an angle which is close to 90 degrees with respect to the surface but is not exactly 90 degrees.

If a field is applied perpendicularly to the surface of the substrates (out-of-plane field), the molecules rotate parallel to the surface of the substrates under an applied field. If light passes perpendicularly through the light modulator, the orientation of the molecules is changed by the electric field from parallel to perpendicular to the propagation direction of the light passing through. In this case, the birefringent effect of the liquid-crystal cell is increased by the field.

Other LC modes are known, for example blue phases which are optically isotropic in the absence of an electric field but become birefringent by applying a field. The following description relates generally to LC modes in which birefringence is produced or modified, that is to say increased or decreased, by applying an electric field.

SUMMARY OF THE INVENTION

It is an object of the invention to provide a simply drivable light modulation device for complex-valued light modulation.

It is furthermore an object of the invention to provide a method for a complex-valued modulation of light with such a light modulation device.

It is also an object of the invention to provide a simply drivable display device for the representation of two-dimensional or three-dimensional scenes.

The object is achieved by the features of the independent claims. The dependent claims and the description relate to advantageous refinements.

The object of the invention relating to the light modulation device is achieved by a light modulation device for a complex-valued modulation of linearly polarized incident light, comprising a first light modulator, a subsequently arranged second light modulator and at least one polarizer, where the first light modulator and the second light modulator are configured as phase modulators, where a modulation axis of the first light modulator is aligned at an angle to the modulation axis of the second light modulator, and where the polarization direction of the light incident on the first light modulator and the polarization direction of the polarizer are respectively aligned at predetermined non-90° angles with respect to the modulation axis of the first light modulator and the modulation axis of the second light modulator.

In the first light modulator, a component oscillating in the direction of the first modulation axis, and in the second light modulator a component oscillating in the direction of the second modulation axis, of the light is respectively modulated in its phase independently of the respective driving of the light modulators. Because of the respectively predetermined non-90° angles between the polarization direction of the light and the modulation axes, there are light components of the light which oscillate in the direction of the modulation axes. By corresponding driving of the light modulators, the phases of these light components may be modified independently of one another. Elliptically, circularly or linearly polarized light is therefore formed after the light passes through the two light modulators, as a function of the respective phase adjustment of the light components. This light is linearly polarized by the polarizer according to its polarization direction. The linearly polarized light emerging from the light modulation device may be adjusted in its amplitude and phase by the driving of the light modulators. To this end, the elliptical, circular or linear polarization of the light emerging from the second light modulator is formed by the driving of the light modulators in such a way that the desired amplitude and phase in the polarization direction of the polarizer are obtained.

Preferably, two phase-modulating light modulators of the same type, which merely differ in the alignment of their modulation axes, may be used in the light modulation device. In this way, the switching characteristic in relation to driving and switching speed of the two light modulators may advantageously be selected to be equal. The driving of the light modulation device is thereby simplified considerably in comparison with light modulation devices having differently configured light modulators. Additional polarization filters are not required between the light modulators, as is necessary for a combination of a phase modulator with an amplitude modulator. With the light modulation device according to the invention, a simple construction having a small number of required components, with simplified alignment of the light modulators with respect to one another, is therefore achieved. Radiation losses due to additional polarization filters are avoided.

According to one preferred configuration variant of the invention, it can be provided that the angle between the modulation axes of the light modulators may be between 60° and 120°, preferably between 80° and 100°, particularly preferably 90°. By the successive light modulators, oscillation components with mutually perpendicular or at least approximately mutually perpendicular oscillation planes are therefore modulated. This allows a large adjustment range for the phase position and the amplitude of the complex-valued modulated light.

Preferably, it can be provided that the polarization direction of the polarizer is aligned at an angle of between 80° and 100°, preferably at an angle of between 85° and 95°, particularly preferably perpendicularly, with respect to the polarization direction of the light incident on the first light modulator, or the polarization direction of the polarizer is aligned at an angle of between −10° and +10°, preferably at an angle of between −5° and +5°, particularly preferably parallel, with respect to the polarization direction of the light incident on the first light modulator.

If the polarization directions of the polarizer and of the light incident on the light modulation device are at an angle of between 80° and 100°, or at an angle of between −10° and +10°, with respect to one another, a very low amplitude of the complex-valued modulated light may be achieved with low adjustment effort for the mutual alignment of the polarization directions with the light modulation device. With a mutual alignment of the polarization directions at an angle of between 85° and 95°, or between −5° and +5°, the lowest adjustable power of the complex-valued modulated light may be reduced further. In this way, a high contrast may be produced between the brightest and darkest positions of a holographic image of an object, generated with the light modulation device. Complete or at least almost complete cancellation of the light emerging from the light modulation device may be achieved with polarization directions aligned perpendicularly or parallel to one another. In this case, with a perpendicular or approximately perpendicular alignment of the polarization directions of the light incident on the light modulation device and of the polarizer, the lowest amplitude is achieved, when the two light modulators cause no mutual phase offset by suitable driving. In the case of a parallel or approximately parallel alignment of the polarization directions, the lowest amplitude is achieved with a mutual phase offset of $\pi$.

Particularly preferably, it can be provided that the predetermined angle between the polarization direction of the light incident on the first light modulator and the modulation axis of the first light modulator is between 30° and 60°, preferably between 40° and 50°, particularly preferably 45°. In an adjustment range of between 30° and 60°, a high output power of the light leaving the light modulation device is made possible with a low required adjustment accuracy. With a predetermined angle of between 40° and 50°, the possible output power may be increased further. In the case of mutual alignment of the polarization direction of the incident light and of the modulation axis of the first light modulator at 45°, a maximum output power of the complex-valued modulated light is made possible.

The polarization direction of the light incident on the first light modulator may be simply predetermined and adapted to the alignment of the modulation axes of the light modulators and/or of the polarization direction of the polarizer if a further polarizer is arranged before the first light modulator in the light propagation direction. The light source used then merely needs to provide sufficiently coherent light.

For example, the polarization states and the modulation in the light modulators are described here in the form of Jones matrices. The light incident on the first light modulator has, for example by the use of the further polarizer described in the previous section, a −45° linear polarization with the Jones vector $$0.7 * \begin{pmatrix} 1 \\ -1 \end{pmatrix}$$

The first light-modulating layer (first light modulator) is represented by the following Jones matrix $$\begin{pmatrix} \exp(i\phi 1(V)) & 0 \\ 0 & 1 \end{pmatrix}$$

where the phase φ1 is modulated in a first direction as a function of the voltage V which is applied to the first modulation layer.

The second light-modulating layer (second light modulator) is represented by the following Jones matrix $$\begin{pmatrix} 1 & 0 \\ 0 & \exp(i\Phi 2(V)) \end{pmatrix}$$

where the phase φ2 is modulated in a second direction as a function of the voltage V which is applied to the second modulation layer.

The polarizer at the output, which has a rotation of 45°, i.e. 90 degrees relative to the polarization direction of the light incident on the first light modulator, has a Jones matrix $$\begin{pmatrix} 0.5 & 0.5 \\ 0.5 & 0.5 \end{pmatrix}$$

The Jones vector of the resulting modulated light is obtained by multiplying the individual matrices by the Jones vector of the incident light.

$$Jout = \begin{pmatrix} 0.5 & 0.5 \\ 0.5 & 0.5 \end{pmatrix} * \begin{pmatrix} 1 & 0 \\ 0 & \exp(i\Phi 2(V)) \end{pmatrix} * \begin{pmatrix} \exp(i\Phi 1(V)) & 0 \\ 0 & 1 \end{pmatrix} * 0.7 * \begin{pmatrix} 1 \\ -1 \end{pmatrix}$$

As $Jout =$ $$\begin{pmatrix} \exp(i\Phi 1(V)) - \exp(i\Phi 2(V)) \\ \exp(i\Phi 1(V)) - \exp(i\Phi 2(V)) \end{pmatrix} = 0.7 * \begin{pmatrix} 1 \\ 1 \end{pmatrix} * (\exp(i\Phi 1(V)) - \exp(i\Phi 2(V)))$$

This is light polarized at 45°

$\exp(i\Phi 1(V)) - \exp(i\Phi 2(V))$ $$= \exp(i\Phi 1(V)) + \exp(i\Phi 2(V) + i\pi) = \cos((\Phi 1(V) - \Phi 2(V) - \pi)/2$$
$$* \exp\left(i \frac{\Phi 1(V) + \Phi 2(V) + \pi}{2}\right)$$

With the amplitude cos(φ1(V)−φ2(V)−π)/2 and the phase φ1(V)+φ2(V)+π)/2 If the two phases φ1(V) and φ2(V) are selected to be equal in this case, an amplitude of cos (−pi/2)=0 is obtained.

In another configuration, it is also possible to select the polarization direction of the incident light and the polarizer at the output to be parallel to one another, for example both at 45°, so that the polarization of the incident light is then changed in comparison with the calculation above. In this case, the Jones vector may be calculated in a similar way as above.

$$Jout = \begin{pmatrix} 0.5 & 0.5 \\ 0.5 & 0.5 \end{pmatrix} * \begin{pmatrix} 1 & 0 \\ 0 & \exp(i\Phi 2(V)) \end{pmatrix} * \begin{pmatrix} \exp(i\Phi 1(V)) & 0 \\ 0 & 1 \end{pmatrix} * 0.7 * \begin{pmatrix} 1 \\ 1 \end{pmatrix}$$

In this case, the amplitude is cos(φ1(V)−φ2(V)/2). This is maximal when the phase modulations of the first and second modulation layers (first and second light modulators) are equal, and minimal when the phase modulations of the first and second modulation layers differ by π.

A simple and cost-efficient construction of the light modulation device using known technology may be achieved in that the first light modulator and the second light modulator are respectively configured as a controllable birefringent liquid-crystal layer. Such electrically controllable liquid-crystal layers are also referred to as ECB (electrically controlled birefringence) cells. For example, nematic liquid crystals with a positive dielectric anisotropy are used, in which without driving the molecules are arranged parallel to the surface of the cell and perpendicular to the light propagation direction. By applying an electric field along the light propagation direction, the molecules are rotated into the light propagation direction and the effective birefringence of the liquid-crystal layer of the cell is reduced for light which passes perpendicularly through the light modulator.

In another embodiment, nematic liquid crystals with a negative dielectric anisotropy with a vertically aligned (VA) LC mode are used, in which without driving the molecules are arranged almost perpendicularly, that is to say at an angle of more than 85° but less than 90°, with respect to the surface of the cell and almost parallel, that is to say at an angle of more than 0° but less than 5 degrees, with respect to the light propagation direction. By applying an electric field along the light propagation direction, the molecules are rotated out of the light propagation direction and the effective birefringence of the liquid-crystal layer of the cell is increased for light which passes perpendicularly through the light modulator. In this case, the pretilt, i.e. the angle of more than zero but less than 5° with respect to the light propagation direction, which is present without driving, in the first and second light-modulating layers is selected in such a way that the tilt directions with respect to the light propagation direction in the first and second light-modulating layers differ from one another by 90°. When there is an applied electric field, the molecules in the first and second light-modulating layers then rotate away from the light propagation direction in two mutually perpendicular planes. By the different rotation directions in the field, different polarization components of the light are phase-modulated in the first and second light-modulating layers.

In a third embodiment, the light modulators comprise light-modulating layers with a blue phase LC mode. Without driving, the light-modulating layers are optically isotropic. When an electric field is applied, a birefringence is formed with an optical axis in the field direction. For phase modulation for a particular linear polarization, line-shaped electrodes are used for generating an in-plane field. In this case, the line-shaped electrodes in the first light-modulating layer are arranged perpendicularly to the line-shaped electrodes in the second light-modulating layer. By the different orientation of the electrodes and therefore the different field direction, an optical axis with a different orientation is generated in the first and second light-modulating layers. In this way, different polarization components of the light are phase-modulated in the first and second light-modulating layers.

If the phase shift is respectively adjustable over a range of at least 2π for the first light modulator and for the second light modulator, all phase shifts of the light emerging from the light modulation device up to 2π may advantageously be adjusted for all amplitudes. If the light modulators respectively allow only phase shifts over a range of less than 2π, only a restricted range of combinations can be adjusted for the amplitude and the phase shift of the emerging light.

The light modulation device is suitable for a hologram reconstruction when the light modulators are respectively divided into a two-dimensional arrangement of pixels which can be driven independently of one another. The phase shift and the amplitude of the complex-valued modulated light may be adjusted for each hologram cell by corresponding driving of pixels, arranged along an axis, of the two light modulators, preferably by electrical driving. In the context of the invention, a hologram cell is formed from two pixels, lying successively in the propagation direction of the radiation and interacting in respect of the phase modulation and amplitude modulation, of the successively arranged light modulators. Compared to light modulation devices with pixels arranged next to or above one another than for the adjustment of a phase and an amplitude in a plane, the light modulation device according to the invention has an improved resolution since two times as many complex-valued pixels can be generated on the same area.

A particularly compact construction of the light modulation device may be achieved in that the first light modulator and the second light modulator are directly connected to one another. Correct alignment of the light modulators with respect to one another is thus achieved over the lifetime of the light modulation device.

Preferably, it can be provided that the first light modulator and the second light modulator have at least one common substrate. By the jointly used substrate, the adjustment of the two light modulators to one another is already established during production and can no longer be changed during operation. The small separation of the light modulators, which is achievable by the common substrate, advantageously leads to a reduction of perturbing diffraction effects in the light propagation between successive pixels. Both radiation losses and perturbing artefacts are thereby kept small.

The object of the invention is also achieved by a method for the complex-valued modulation of linearly polarized light with a first light modulator, a subsequently arranged second light modulator and at least one polarizer, where a light component, oscillating in the direction of a modulation axis of the first light modulator, of the light is adjustably retarded in its phase by the first light modulator, where a light component, oscillating in the direction of the modulation axis of the second light modulator, of the light is adjustably retarded in its phase by the second light modulator, where the modulation axis of the first light modulator is aligned transversely, in particular perpendicularly, with respect to the modulation axis of the second light modulator, and where the light emerging from the second light modulator is linearly polarized by the polarizer aligned at a non-90° angle with respect to the modulation axes.

With the propagation direction of the light to be modulated, a modulation axis spans an oscillation plane for light components on which the respective light modulator acts in an adjustably phase-retarding manner. Light components of the light which oscillate in the direction of the modulation axis can be adjusted in their phase by the respective light modulator, while light components oscillating perpendicularly to the modulation axis cannot be modified, or cannot be modified adjustably, in their phase.

That the first light modulator can adjustably retard the phase of a first light component may therefore presuppose that the linearly polarized light incident on the first light modulator comprises light components which are aligned in the direction of the first modulation axis of the first light modulator. The polarization direction of the light incident on the first light modulator must therefore be aligned at a non-90° angle with respect to the first modulation axis of the first light modulator. So that the second light modulator can adjustably retard the phase of the second light component, it may be necessary for the polarization direction of the light incident on the first light modulator to be aligned at a non-90° angle with respect to the second modulation axis of the second light modulator. The polarization direction of the light incident on the first light modulator therefore advantageously lies between the alignments of the modulation axes.

If one light component is retarded in its phase relative to the other, circularly, elliptically or linearly polarized light is obtained after the light modulators. The polarization formed for this light may be adjusted by the selection of the retardation of the light components. By suitable adaptation of the polarization of the radiation present after the second light modulator to the polarization direction of the polarizer, the amplitude and the phase of the light emerging from the polarizer can be adjusted.

Preferably, the modulation axes of the light modulators are mutually perpendicular and the polarization directions of the light incident on the first light modulator and of the polarizer are aligned at 45° with respect to the modulation axes.

It may be particularly preferred for the phase of the light emerging after the polarizer, for an equal amplitude, to be modified in that the phase retardations of a light component modulated by the first light modulator and of a light component modulated by the second light modulator are modified by an equal value. By the phase modification of the two light components in the same sense, the amplitude of the light emerging from the polarizer is preserved, while its phase changes. If the light modulators respectively allow a phase shift of at least 2*π, the normalized amplitude may be adjusted between the two light components from 0 to 1 by adjusting the phase difference from 0 to 2π. In this case, as described above, whether a phase difference of 0 between the two light components corresponds to a normalized amplitude of 0 or 1 depends on whether the polarization direction of the polarizer is selected to be perpendicular or parallel to the polarization direction of the light incident on the first light modulator. A phase difference of π of the light components gives a minimum amplitude for the same alignment of the polarizations of the light incident on the first light modulator and of the polarizer, and gives a maximum amplitude with a perpendicular alignment of the polarizations with respect to one another. Correspondingly, a phase difference of 0 of the light components produces a maximum amplitude for the same alignment of the polarizations of the light incident on the first light modulator and of the polarizer, and produces a minimum amplitude with a perpendicular alignment of the polarizations with respect to one another. Independently of the amplitude adjusted, in both polarizer arrangements the phase of the light emerging from the light modulation device may be modified in the range of between 0 and 2π for all amplitude values.

Preferably, it can be provided that the amplitude of the light emerging from the polarizer, for an equal phase, may be modified in that the phase retardations of the light component modulated by the first light modulator and of the light component modulated by the second light modulator are modified oppositely by the same magnitude. It is thus possible to modify the amplitude of the light emerging from the light modulation device without its phase changing.

The object of the invention relating to the display device is achieved by a display device, in particular a holographic display device, for the representation of two-dimensional or three-dimensional scenes, where the display device comprises a light modulation device having the features of claim 1. By using two successively arranged light modulators of the same type, the phase and the amplitude of light can be adjusted in a wide range with simple driving of the light modulators.

Preferably, in this case, an illumination device may preferably be assigned to the display device and the illumination device may emit coherent or linearly polarized coherent light. If the illumination device emits coherent light, its amplitude and phase may be adjusted in a controlled way by the light modulators. If the light emitted by the illumination device is linearly polarized, the further polarizer may be omitted.

BRIEF DESCRIPTION OF THE DRAWINGS

The invention will be explained in more detail below with the aid of exemplary embodiments and the appended figures. In the figures, references which are the same refer to elements which are the same or which correspond to one another FIG. 2 shows light modulators shown in FIG. 1 in various switching states in a schematic representation, FIG. 3 a, b shows an embodiment of the light modulation device with electrically switchable birefringent liquid crystals, FIG. 4 a, b shows an embodiment of the light modulation device with liquid crystals aligned perpendicularly to the substrate without a control voltage, FIG. 5 a, b shows an embodiment of the light modulation device with blue phase liquid crystals.

DETAILED DESCRIPTION OF THE INVENTION

Figure 1:
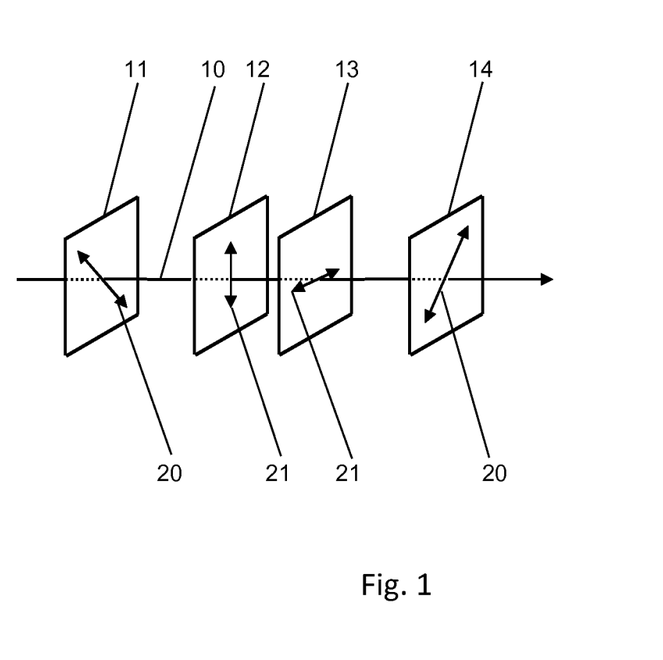
FIG. 1 shows components of a light modulation device in a schematic perspective representation.

FIG. 1 shows components of a light modulation device in a schematic perspective representation. They are arranged along a propagation direction of light 10 guided through the light modulation device. In order to describe the function of the light modulation device, a separated representation of the components is selected. When the light modulation device is set up, the components preferably follow one another directly in the propagation direction of the light 10.

Light 10 strikes a first light modulator 12 and subsequently a second light modulator 13. An individually drivable pixel of the light modulators 12, 13 is respectively shown. The complete light modulators 12, 13 are formed from a multiplicity of such pixels arranged in the form of a grid in a plane.

The light 10 is sufficiently coherent for the formation of interference. After the second light modulator 13, the light 10 is delivered to a linearly polarizing polarizer 14.

A further polarizer 11, to which the light 10 is delivered, is provided for the polarization of the light 10. It is, however, also conceivable to use a radiation source which already emits polarized light, for example a linearly polarized laser beam. The further polarizer 11 may then be omitted.

After the polarizer 14, the light 10 emerges from the light modulation device.

The first light modulator 12 has a modulation axis 21 and the second light modulator 13 has a modulation axis 21 rotated at an angle thereto, these being symbolically represented by arrows. The modulation axes 21 are aligned transversely, in the present case perpendicularly, to the propagation direction of the light 10. The angle between the modulation axes 21 is 90° in the exemplary embodiment shown. The modulation axes 21 are therefore mutually perpendicular.

A polarization direction 20 of the further polarizer 11, and therefore of the light 10 incident on the first light modulator 12, is likewise denoted by an arrow. It is arranged at an angle both with respect to the modulation axis 21 of the first light modulator 12 and with respect to the modulation axis 21 of the second light modulator 13. In the present case and advantageously, the polarization direction 20 of the light 10 incident on the first light modulator 12 is aligned at an angle of 45° with respect to the modulation axis 21 of the first light modulator 12 and with respect to the modulation axis 21 of the second light modulator 13.

The polarization direction 20 of the polarizer 14 is denoted by an arrow. It is respectively aligned at an angle with respect to the polarization direction 20 of the light 10 incident on the first light modulator 12, with respect to the modulation axis 21 of the first light modulator 12 and with respect to the modulation axis 21 of the second light modulator 13. In the exemplary embodiment shown, the polarization direction 20 of the polarizer 14 is aligned perpendicularly to the polarization direction 20 of the light 10 entering the light modulation device. It is therefore likewise at an angle of 45° in each case with respect to the modulation axes 21. It is also conceivable to align the polarization directions 20 of the light 10 entering the light modulation device and of the polarizer 14 parallel to one another. For the function of the light modulation device, it is essential for the polarization directions 20 to be aligned obliquely, preferably at an angle of 45°, with respect to the modulation axes 21 of the light modulators 12, 13.

The modulation axes 21, 21 specify polarization directions of the light 10 for which light modulators 12, 13 have a phase-modulating effect. The two light modulators 12, 13 may be driven independently of one another. The linearly polarized light 10 incident on the first light modulator 12 may conceptually be divided into a light component which is polarized in the direction of the modulation axis 21 of the first light modulator 12 and a light component polarized perpendicularly thereto. Correspondingly, the light 10 delivered to the second light modulator 13 may be divided into a light component which is polarized in the direction of the modulation axis 21 of the second light modulator 13 and a light component polarized perpendicularly thereto. Depending on the driving of the light modulators 12, 13, in each light modulator 12, 13 only the light component polarized in the direction of its modulation axis 21, 21 is retarded in its phase, while the light component polarized perpendicularly thereto is not retarded. Because of the oblique alignment of the polarization direction 20 of the light 10 incident on the first light modulator 12 with respect to the modulation axes 21 of the first and second light modulators 12, 13, there are light components oscillating in the direction of both modulation axes 21. These may be shifted in their phase independently of one another by corresponding driving of the light modulators 12, 13. On the basis of the alignment as shown of the polarization direction 20 of the further polarizer 11 at 45° with respect to the modulation axes 21 of the first and second light modulators 12, 13, the light components polarized in the direction of the modulation axes 21 are advantageously of equal size. Equal light components are therefore modulated by the two light modulators 12, 13. It is, however, also possible to provide an angle other than 45° between the first polarization direction 20 and the modulation axes 21, 21. In such an arrangement, the light components oscillating in the direction of the first and second modulation axes 21, 21 differ.

Figure 2:
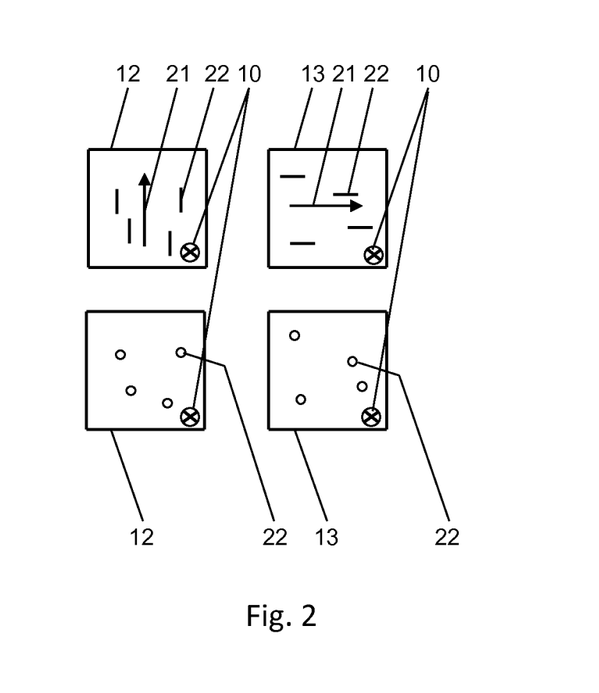

FIG. 2 shows the light modulators 12, 13 shown in FIG. 1 in various switching states in a schematic representation. In this case, the light modulators 12, 13 are shown separately next to one another and therefore not in the order in which they are arranged in a light modulation device. The representations arranged above one another show the light modulators 12, 13 in two switching states. The propagation direction of the light 10 is denoted in a conventional representation by crosses, and points into the plane of the representation.

The light modulators 12, 13 comprise switchable birefringent materials. In these, the refractive index for one polarization direction of the incident light 10 can be modified while light components polarized perpendicularly thereto remain unaffected.

In the exemplary embodiment shown, the light modulators 12, 13 are configured as two liquid-crystal cells rotated through 90° with respect to one another. Such liquid-crystal cells, which are known per se, are referred to in the form used as an Electrically Controlled Birefringence (ECB) liquid crystal, as a Fréedericksz cell or as a zero-twisted nematic. "Zero-twisted" means that they are nematic liquid crystals without a twist. Inside a phase-modulating layer, the liquid crystals are aligned at least approximately in the same way. In the upper representation of FIG. 2, the light modulators 12, 13 are shown without an applied electric field. The modulation axes 21 of the light modulators 12, 13 are aligned according to the alignment of a molecular axis 22 of the liquid crystals. The molecular axes 22 of the liquid crystals in the light modulators 12, 13 correspond to the optical axes of the liquid crystals. Of the many crystals present, only a few are symbolically represented. The modulation axes 21 of the two light modulators 12, 13 are mutually parallel, as described with reference to FIG. 1. In the arrangement shown, the modulation axis 21 of the first light modulator 12 is aligned vertically and the modulation axis 21 of the second light modulator 13 is aligned horizontally. The lower representations of FIG. 2 show the alignment of the liquid crystals in the presence of a sufficiently high electric field in the direction of the propagation direction of the light 10 passing through. By the action of the electric field, the liquid crystals are rotated so that the molecular axes 22 are arranged perpendicularly to the plane of the representation. This is symbolized by circles. By varying the electric field, intermediate settings of the molecular axes 22 may be adjusted between the orientations shown.

In the case of molecular axes 22 aligned transversely with respect to the propagation direction of the light 10, the liquid crystals have a phase-retarding effect on the light components of the light 10 which are polarized along their molecular axes 22. Light components polarized perpendicularly thereto are not, or at least not switchably, influenced in their phase when passing through the respective light modulator 12, 13. By tilting of the molecular axes 22 in the propagation direction of the light 10, the phase-retarding effect of the liquid crystals decreases. If the molecular axes 22 are fully aligned in the propagation direction of the light, no phase retardation takes place, or the phase retardation is the same for all light components.

Figure 3A:
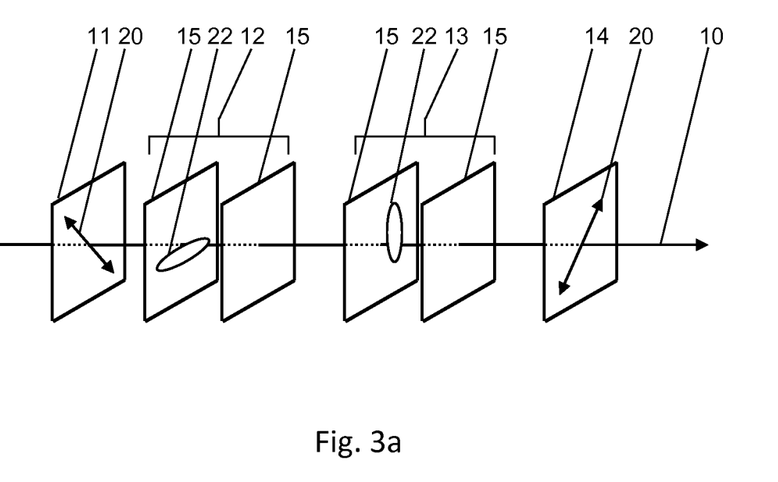

FIG. 3a shows a three-dimensional representation of the configuration as described in FIG. 1 of the light modulation device with an electrically controllable birefringent liquid crystal (Electrically Controlled Liquid Crystal; ECB LC mode) as an optically active element of the first and second light modulators 12, 13. Represented are the two polarizers 11, 14, which in this example are arranged rotated through 90 degrees with respect to one another, and the two light modulators 12, 13, in which the liquid crystals are respectively arranged between two substrates 15. The switching states of the liquid crystals are respectively denoted by the orientation of the molecular axis 22. The orientation of the molecular axes 22 is specified here by a pretreatment of the surfaces of the substrates 15. In the second light modulator 13, the molecular axes 22 are oriented perpendicularly to the molecular axes 22 in the first light modulator 12, and in both they are oriented perpendicularly to the propagation direction of the light 10. The molecular axes 22 are therefore parallel to the surfaces of the substrates 15. In the direction of the molecular axis 22, the liquid crystal has a higher refractive index than perpendicularly to the molecular axis 22. In this way, the light 10 is shifted differently in its phase depending on its polarization direction.

As described above, the two light modulators 12, 13 may also have a common central substrate 15. The substrates 15 respectively comprise two-dimensional electrodes. In the case of a pixel structure, each pixel has its own electrode on one of the substrates of each light modulator 12, 13, and there is a shared common electrode on the other substrate for all pixels. A common substrate 15 respectively has an electrode on each side. This is preferably the common electrode in both cases, so that the pixel electrodes are arranged on the respective outer substrates 15 of the two light modulators 12, 13.

Figure 3B:
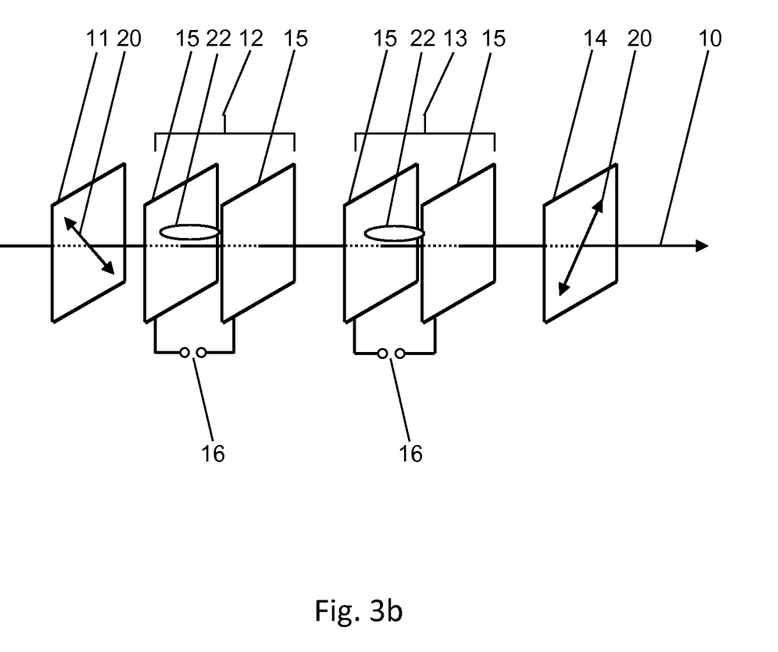

FIG. 3b shows the arrangement of FIG. 3a with additional connections for the electrodes on the substrates 15, so that a control voltage 16 can be applied mutually independently to each light modulator 12, 13. If such a control voltage 16 is applied, an electric field is formed between the substrates 15 of the first light modulator 12. Likewise, an electric field is formed between the substrates 15 of the second light modulator 13. In the case of a high control voltage 16, the molecular axes 22 are rotated in the field direction, as is represented in FIG. 3b. The phase shift of the light 10 when a high control voltage 16 is applied is therefore no longer dependent on its polarization direction. For lower control voltages 16, there are intermediate states in which the molecular axes 22 are partially rotated.

Figure 4A:
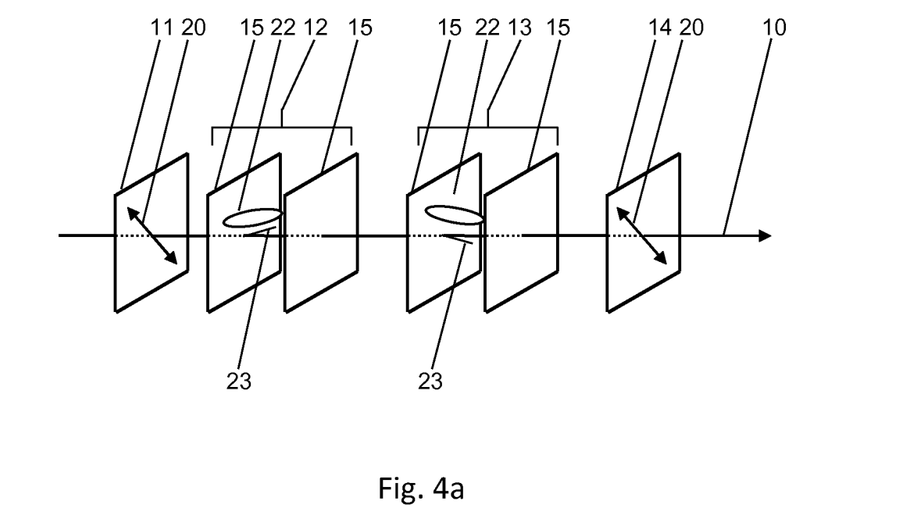

FIG. 4a shows a three-dimensional representation of the above-described configuration of the light modulation device with a liquid crystal aligned perpendicularly to the surface of the substrates 15 without an electric field (Vertically Aligned Liquid Crystal; VA LC mode). The propagation direction of the light 10 again extends from left to right in this figure. The two polarizers 11, 14 are represented. In this example, the two polarizers 11, 14 are arranged parallel. The parallel arrangement of the polarizers 11, 14 is not, however, restricted to this exemplary embodiment with a VA LC mode. Polarizers 11, 14 which are parallel or rotated through 90 degrees with respect to one another may respectively also be used selectively for the LC modes described in the preceding and subsequent figures.

Without the effect of an electric field, because of the surface interaction with the substrates 15, the molecular axes 22 in the first and the second light modulator 12, 13 are respectively tilted by a small angle 23 of less than 5° with respect to the propagation direction of the light 10. This tilt is set up in two mutually perpendicular planes in the first and the second light modulator 12, 13. In the example shown, the angle 23 in the first light modulator 12 lies in a horizontal plane, and in the second light modulator 13 it lies in a vertical plane. In this configuration of the invention, liquid-crystal molecules which have a negative dielectric anisotropy, which are aligned perpendicularly to the field direction in an electric field, are used.

Figure 4B:
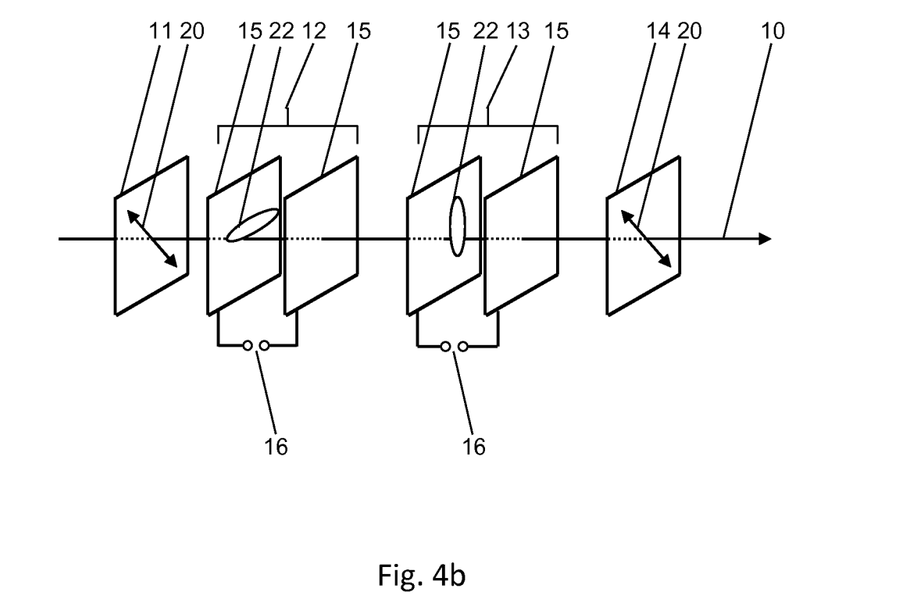

FIG. 4b represents the arrangement of FIG. 4a, connections for the control voltage 16 additionally being provided. Planar electrodes are again used on the substrates 15, so that a field is respectively applied between two electrodes of a light modulator 12, 13 (out-of-plane field). The molecular axes 22 of the liquid-crystal molecules then rotate in the two light modulators 12, 13 perpendicularly to the field, but in a direction which is specified by the small angle 23 of the surface orientation. In this way, when the control voltage 16 is turned on, the molecular axis 22 and therefore also the optical axis, is oriented differently in the two light modulators 12, 13. In the case of a high applied control voltage 16, a similar orientation of the molecular axes 22 of the liquid crystals is set up as in the ECB mode of FIG. 3a for the control voltage 16 being turned off. With respect to the phase modulation and amplitude modulation, the VA mode in this case acts in the opposite way to the ECB mode. While the phase modulation of the light modulators 12, 13 decreases with a higher applied control voltage 16 in the ECB mode, in the VA mode it increases with a higher applied control voltage 16.

Figure 5A:
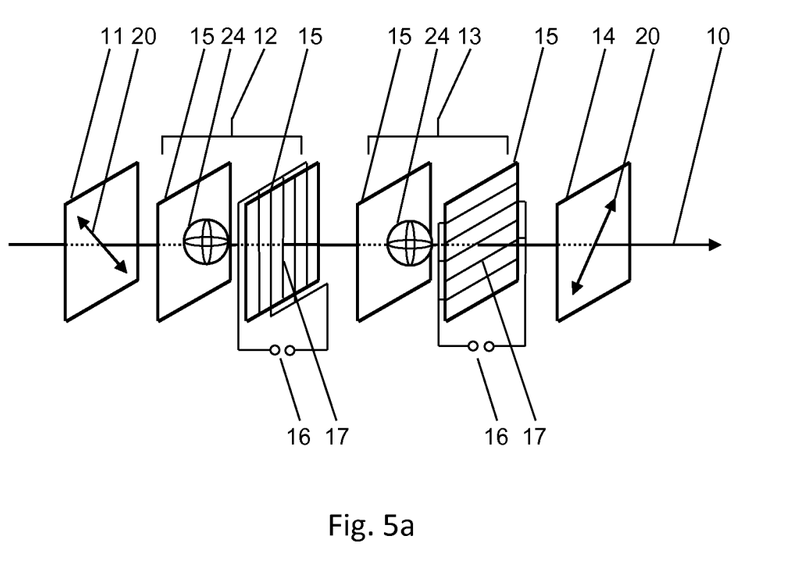

FIG. 5a shows a three-dimensional representation of the above-described configuration of the light modulation device with a blue phase liquid crystal (blue phase LC mode). The propagation direction of the light 10 again takes place from left to right in this figure. The two polarizers 11, 14, in this example rotated through 90 degrees with respect to one another, are represented. In this exemplary embodiment, for each light modulator 12, 13, line electrodes 17 respectively on one of the substrates 15 are used to generate an in-plane field (parallel to the surface of the substrate 15), while the second substrate 15 does not have an electrode. The control voltage 16 may be applied to the line electrodes 17 by means of connections. The line electrodes on the first light modulator 12 are rotated through 90 degrees relative to the line electrodes 17 on the second light modulator 13. Without a control voltage 16, the blue phase liquid crystals in the light modulator 12, 13 are optically isotropic. This is represented by a spherical refractive index ellipsoid 24.

Figure 5B:
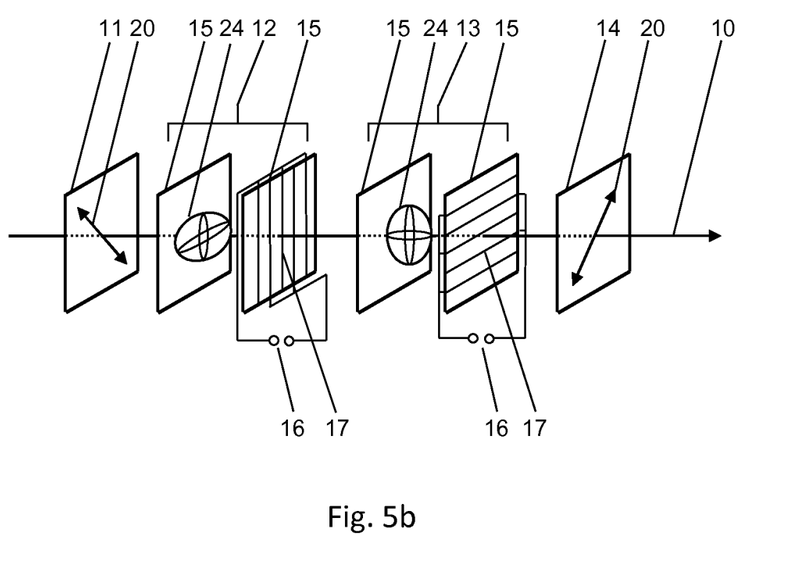

FIG. 5b shows the arrangement of FIG. 5a when there is an applied control voltage 16. An optical axis is formed in the field direction specified by the line electrodes 17. This is represented by the refractive index ellipsoid 24. The birefringence of the blue phase liquid crystals in this case increases with an increasing field. Because of the different orientations of the line electrodes 17, the optical axes of the first and second light modulators 12, 13 differ by 90 degrees. The optical axes are in this case determined not by the alignment of an individual liquid-crystal molecule but by the arrangement of many molecules. The sphere or ellipse indicated in FIGS. 5a, 5b thus indicates the orientation of the optical axis only schematically.

Figure 6:
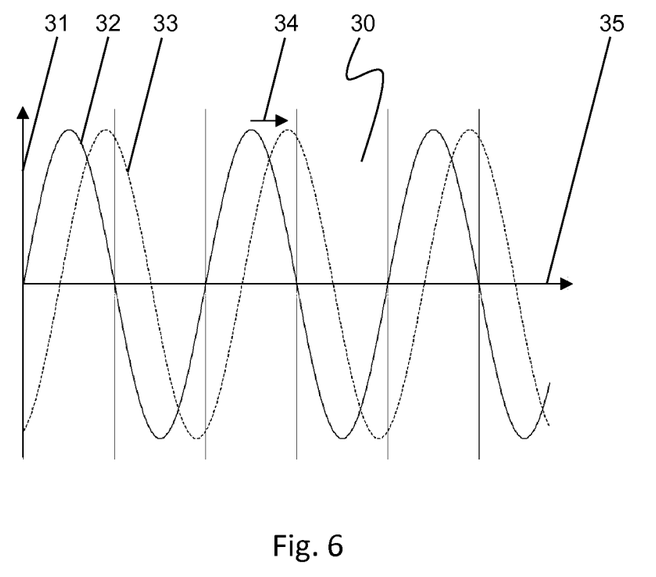
FIG. 6 shows temporal amplitude profiles of two light components after passing through two light modulators shown in FIGS. 1 to 5b in a first amplitude diagram.

FIG. 6 shows temporal amplitude profiles 32, 33 of two light components of the light 10 after passing through the two light modulators 12, 13 shown in FIGS. 1 to 5b, in a first amplitude diagram 30. The amplitude profiles 32, 33 are plotted against a common first amplitude axis 31 and a first time axis 35. The first amplitude profile 32 is assigned to a light component with a polarization aligned in the direction of the modulation axis 21 of the first light modulator 12, and the second amplitude profile 33 is assigned to a light component with a polarization aligned in the direction of the modulation axis 21 of the second light modulator 13. The second amplitude profile 33 is phase-retarded relative to the first amplitude profile 32. A corresponding phase shift 34 is denoted by an arrow. The size of the phase shift 34 is dictated by the respective phase retardation of the light components of the light 10 in the two light modulators 12, 13. It is correspondingly adjustable. The phase retardation achievable by a light modulator 12, 13 as an angular dimension is dictated by the thickness of the liquid-crystal layer, the difference in the refractive index for light components polarized along the modulation axis 21 and perpendicularly thereto, and the wavelength of the light 10. The refractive index for light components polarized along the modulation axis 21 may be adjusted as a function of the rotation angle of the optical axes of the molecules 22, or of the refractive index indicated by the refractive index ellipsoid.

By the path differences indicated between the light components of the light 10 which are aligned perpendicularly to one another, the radiation emerging from the second light modulator 13 is polarized circularly, elliptically or linearly.

Figure 7:
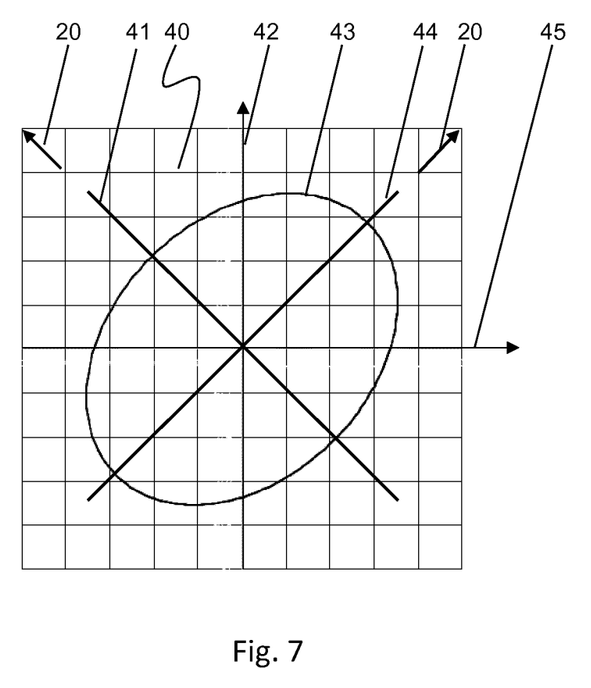
FIG. 7 shows possible amplitude profiles of the radiation after passing through the light modulators shown in FIGS. 1 to 5b in a second amplitude diagram in a viewing direction along its propagation direction.

FIG. 7 shows possible amplitude profiles 41, 43, 44 of the light 10 after passing through the light modulators 12, 13 shown in FIGS. 1 to 5b in a second amplitude diagram 40 in a viewing direction along the propagation direction of the light 10. The amplitude profiles 41, 43, 44 are plotted against a second amplitude axis 42 and a third amplitude axis 45. The second amplitude axis 42 points in the direction of the modulation axis 21 of the first light modulator 12 and the second amplitude axis 45 points in the direction of the modulation axis 21 of the second light modulator 13, as shown in FIGS. 1 to 5b. In the second amplitude diagram 40, the polarization direction 20 of the light 10 incident on the first light modulator 12 is represented as an arrow pointing toward the upper left. The polarization direction 20 of the light 10 after the polarizer 14 is represented as an arrow pointing toward the upper right. In this case, the polarization directions 20 of the light 10 incident on the first light modulator 12 and that of the light 10 after the polarizer 14 are mutually perpendicular and at an angle of 45° with respect to the modulation axes 21 of the two light modulators 12, 13, as is shown in FIG. 1. As already mentioned, it is conceivable to align the two polarization directions 20 of the light 10 incident on the first light modulator 12 and that of the light 10 after the polarizer 14 in the same way.

The linearly polarized third amplitude profile 41 is obtained when there is no phase difference, or a phase difference corresponding to an even multiple of π, between the light components phase-modulated by the successive light modulators 12, 13. The likewise linearly polarized fifth amplitude profile 44 is obtained with a phase difference of π or an odd multiple of π between the light components. An elliptically polarized fourth amplitude profile 43 is set up with a phase difference which does not correspond to an integer multiple of π and is nonzero. The shape and the alignment of the ellipse are dictated by the size of the phase difference. Circularly polarized light is obtained with a phase difference of 0.5 π. The rotation direction of the elliptically or circularly polarized radiation is established by which light component precedes the other.

The light 10 emerging from the second light modulator 13 is delivered to the polarizer 14. The latter is transmissive only for light components polarized along its polarization direction 20. Radiation polarized according to the third amplitude profile 41 and therefore transversely with respect to the polarization direction 20 of the polarizer 14 is therefore entirely suppressed by the polarizer 14. The radiation polarized in the polarization direction 20 of the polarizer 14 according to the fifth amplitude profile 44 can, however, pass fully through the polarizer 14, or at least almost fully, taking radiation losses into account. If, according to one possible configuration variant of the invention, the polarization directions 20 of the light 10 incident on the first light modulator 12 and of the polarizer 14 are aligned in the same way, light 10 according to the third amplitude profile 41 can pass through the polarizer 14 while light 10 according to the fifth amplitude profile 44 is blocked by the polarizer 14.

In the case of light 10 polarized elliptically or circularly after the second light modulator 13, the light component polarized parallel to the polarization direction 20 of the polarizer 14 passes through the polarizer 14.

Figure 8:
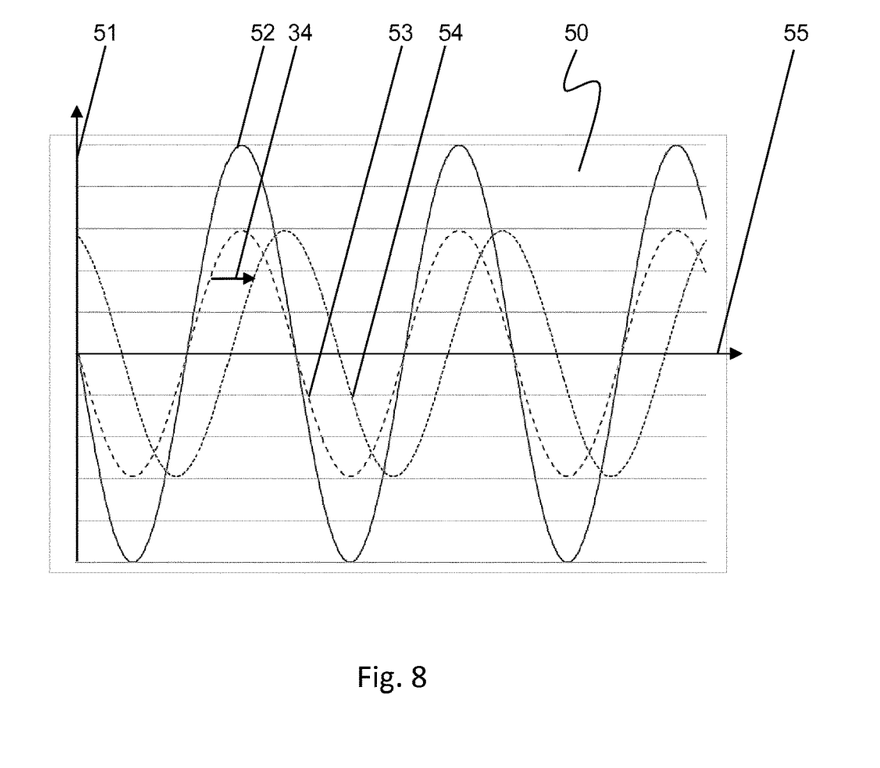
FIG. 8 shows temporal amplitude profiles of the output radiation of the light modulation device for different settings of the light modulators shown in FIGS. 1 to 5b in a third amplitude diagram.

FIG. 8 shows temporal amplitude profiles 52, 53, 54 of the light 10 after the polarizer 14 of the light modulation device in a third amplitude diagram 50 for different settings of the light modulators 12, 13 shown in FIGS. 1 to 5b. To this end, a sixth, a seventh and an eighth amplitude profile 52, 53, 54 are plotted against a fourth amplitude axis 51 and a second time axis 55. The fourth amplitude axis 51 is aligned along the polarization direction 20 of the polarizer 14.

The light 10 after the polarizer 14 according to the sixth amplitude profile 52 has a maximum amplitude of normalized 1. As described with reference to FIG. 7, in the case of mutually perpendicular polarization directions 20 of the light before the first light modulator 12 and of the polarizer 14, this is achieved with a phase difference between the light components modulated in the light modulators 12, 13 of π or an odd multiple of π. In the case of polarization directions 20 of the polarizer 14 and of the further polarizer 11 arranged parallel to one another, the maximum amplitude is obtained with a phase difference of 0 or an even multiple of π between the light components of the light 10.

By modification of the phase difference between the light components, the amplitude of the light 10 after the polarizer 14 is modified, as is shown by the seventh and the eighth amplitude profiles 53, 54 in comparison with the sixth amplitude profile 52. The phase of the light 10 after the polarizer 14 is in this case preserved, as shown by the seventh amplitude profile 53, if the light modulators 12, 13 are adjusted oppositely by the same magnitude. For example, the phase retardation caused by the first light modulator 12 may be reduced by a magnitude and the phase retardation caused by the second light modulator 13 may be increased by the same magnitude. The amplitude of the light 10 after the polarizer 14 itself is established by the phase difference between the two light components. If the phase retardations caused by the two light modulators 12, 13 are modified in the same sense by the same magnitude, the phase of the light 10 after the polarizer 14 changes with an equal amplitude. This is represented in a comparison between the seventh and eighth amplitude profiles 53, 54. By modification of the phase retardations of the two light components of the light 10 by different magnitudes, both the amplitude and the phase of the light 10 after the polarizer 14 may be modified.

In order to be able to adjust all phases from 0 to 2π for all amplitudes of at least approximately zero to 1, it is necessary for the light modulators 12, 13 respectively to achieve at least a phase retardation of up to 2π.

With two phase-modulating light modulators of the same type, the light modulation device according to the invention allows complex-valued modulation of sufficiently coherent light, such as is suitable for example for hologram reconstruction. With such complex-valued modulation, both the phase and the amplitude of the light can be adjusted independently of one another. The components of the light modulation device are arranged in a sandwich arrangement. The precise alignment in particular of the light modulators 12, 13 with respect to one another is carried out when setting up the light modulation device and is maintained during its period of use. It is conceivable to use a common substrate 15 for the two light modulators on their mutually opposing faces. This ensures exact mutual alignment of the light modulators 12, 13, and at the same time a small distance and therefore a small parallax between the pixels, forming a hologram cell, of the successively arranged light modulators 12, 13 is achieved. Radiation losses at the transition of the radiation to the second light modulator 13 because of diffraction effects at the pixels of the first light modulator 12 may also be kept low by the small spacing of the light modulators 12, 13.

Advantageously, light modulators 12, 13 of the same type are used. The light modulators 12, 13 may therefore be produced with the same manufacturing processes and systems, so that the production costs can be kept low. The drive characteristic, which for example represents the ratio of a drive voltage to an assigned phase value, is the same for both light modulators 12, 13. The overall outlay for the production and driving of the light modulation device may therefore be reduced significantly in comparison with a construction with an amplitude modulator and a phase modulator.

A further advantage of the light modulation device according to the invention over known light modulation devices is that no additional components, and in particular no additional polarizers, are required between the light modulators 12, 13. This also allows a small separation of the phase-modulating layers and/or the use of a common substrate with the advantages described above. Light losses at the additional components are avoided. A further advantage of the light moderation device according to the invention results from the fact that the same configuration of the polarizers is suitable for different wavelengths of the radiation used. For color holographic representations, for example, it is possible to use a single polarizer 14 and if required a single further polarizer 11 for the neighboring hologram cells modulating light of different primary colors.

An additional advantage over known light modulation devices is based on the fact that the overall modulation of the light modulation device according to the invention is obtained as the sum of two individual modulations of the successive light modulators 12, 13. In known light modulation devices such as are described for example in the article "Full-range, continuous, complex modulation by the use of two coupled-mode liquid-crystal televisions", Neto et al, Applied Optics Vol. 35, No 23, pp 4567, the overall modulation is formed as the product of two individual modulations. In the event of an erroneous value, for example in the event of noise of pixels of one of the light modulators 12, 13, the overall error in the light modulation device according to the invention is consequently given only as the sum of the individual errors, while in known light modulation devices the overall error is formed as the product of the individual errors.

Light modulators 12, 13 with switchable birefringent properties may be used for constructing the light modulation device. The use of liquid crystals case straightforward and economical. They are preferably configured as nematic liquid crystals without a twist (zero-twisted nematic LC), as electrically controlled liquid crystals, as vertically aligned liquid crystals or as blue phase liquid crystals. Simple and reproducible adjustment of the phase retardations is achieved with electrically drivable light modulators 12, 13. Such electrically drivable light modulators 12, 13 are known as ECB (electrically controlled birefringence) liquid-crystal pixels, and by the synonyms "Fréedericksz cell" or "zero-twisted nematic". It is, however, also conceivable to use light modulators 12, 13 other than electrically drivable light modulators 12, 13, for example optically drivable light modulators 12, 13.

Figure 9:
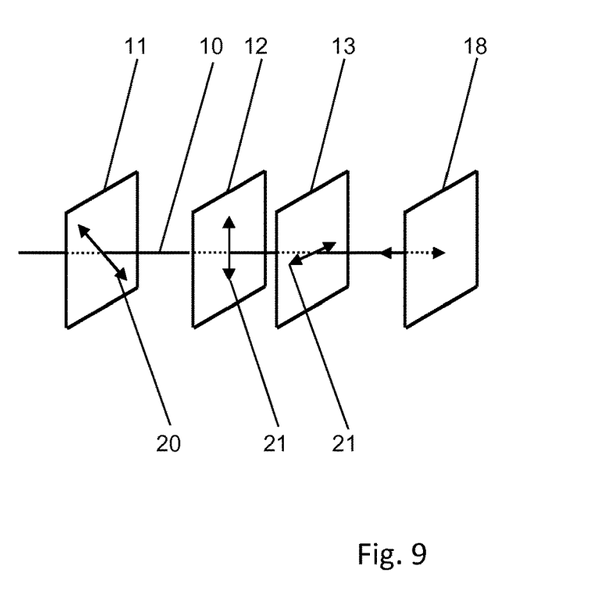
FIG. 9 shows an embodiment of the light modulation device with a reflective element.

FIG. 9 shows a light modulation device with a reflective element 18. The light 10 entering the device is polarized by the further polarizer 11 according to its polarization direction 20 and is delivered to the first light modulator 12. The light 10 subsequently passes through the second light modulator 13 and strikes the reflective element 18. From there, it is guided back to the second light modulator 13 and to the first light modulator 12, and leaves the arrangement through the polarizer 11. This is therefore a reflective display device, while the arrangements of FIGS. 1 to 5b are transmissive display devices.

The invention claimed is:

1. A light modulation device for a complex-valued modulation of linearly polarized incident light, comprising a first light modulator, a subsequently arranged second light modulator and at least one polarizer, where the first light modulator and the second light modulator are configured as phase modulators, where a modulation axis of the first light modulator is aligned at an angle to a modulation axis of the second light modulator, where a polarization direction of the light incident on the first light modulator and a polarization direction of the polarizer are respectively aligned at predetermined non-90° angles with respect to the modulation axis of the first light modulator and the modulation axis of the second light modulator, and where a phase shift is respectively adjustable over a range of at least 2π for the first light modulator and for the second light modulator.

2. The light modulation device as claimed in claim 1, wherein the angle between the modulation axes of the first light modulator and of the second light modulator is between 60° and 120°.

3. The light modulation device as claimed in claim 1, wherein the polarization direction of the polarizer is aligned at an angle of between 80° and 100° with respect to the polarization direction of the light incident on the first light modulator, or in that the polarization direction of the polarizer is aligned at an angle of between −10° and +10° with respect to the polarization direction of the light incident on the first light modulator.

4. The light modulation device as claimed in claim 1, wherein the predetermined angle between the polarization direction of the light incident on the first light modulator and the modulation axis of the first light modulator is between 30° and 60°.

5. The light modulation device as claimed in claim 1, wherein a further polarizer is arranged before the first light modulator in the light propagation direction.

6. The light modulation device as claimed in claim 1, wherein the first light modulator and the second light modulator are respectively configured as a controllable birefringent liquid-crystal layer.

7. The light modulation device as claimed in claim 1, wherein the first light modulator and the second light modulator are directly connected to one another.

8. The light modulation device as claimed in claim 1, wherein the first light modulator and the second light modulator have at least one common substrate.

9. A display device, in particular a holographic display device, for the representation of at least one of two-dimensional and three-dimensional scenes, where the display device comprises a light modulation device as claimed in claim 1.

10. The display device as claimed in claim 9, wherein an illumination device is assigned to the display device, and in that the illumination device emits coherent or linearly polarized coherent light.

11. A method for a complex-valued modulation of linearly polarized light comprising a first light modulator, a subsequently arranged second light modulator and at least one polarizer, where a light component, oscillating in a direction of a modulation axis of the first light modulator, of the light is adjustably retarded in its phase by the first light modulator, where a light component, oscillating in a direction of a modulation axis of the second light modulator, of the light is adjustably retarded in its phase by the second light modulator, where the modulation axis of the first light modulator is aligned transversely, in particular perpendicularly, with respect to the modulation axis of the second light modulator, where the light emerging from the second light modulator is linearly polarized by the polarizer aligned at a non-90° angle with respect to the modulation axes, and where a phase shift is respectively adjustable over a range of at least 2π for the first light modulator and for the second light modulator.

12. The method as claimed in claim 11, wherein a phase of the light emerging from the polarizer, for an equal amplitude, is modified in that phase retardations of the light component modulated by the first light modulator and of the light component modulated by the second light modulator are modified by an equal value.

13. The method as claimed in claim 11, wherein an amplitude of the light emerging from the polarizer, for an equal phase, is modified in that phase retardations of the light component modulated by the first light modulator and of the light component modulated by the second light modulator are modified oppositely by the same magnitude.

* * * * *